United States Patent
Deland et al.

(10) Patent No.: US 6,840,588 B2
(45) Date of Patent: Jan. 11, 2005

(54) NON-REPEATING SEQUENCE OF PROFILES

(75) Inventors: André Deland, Drummondville (CA); Yves St-Pierre, Wickham (CA); Éric Blais, Drummondville (CA)

(73) Assignee: Soucy International Inc., Drummondville (CA)

( * ) Notice: Subject to any disclaimer, the term of this patent is extended or adjusted under 35 U.S.C. 154(b) by 53 days.

(21) Appl. No.: 10/280,076

(22) Filed: Oct. 25, 2002

(65) Prior Publication Data

US 2004/0080210 A1 Apr. 29, 2004

(51) Int. Cl.[7] ................. B62D 55/24; B62D 55/275; B64C 25/00
(52) U.S. Cl. ................. 305/178; 305/165; 305/179
(58) Field of Search ................. 305/178, 157–158, 305/160, 165, 167–169, 171, 179, 185, 180

(56) References Cited

U.S. PATENT DOCUMENTS

| | | | | |
|---|---|---|---|---|
| 5,641,214 A | * | 6/1997 | Kafka | ............... 305/180 |
| 5,690,398 A | * | 11/1997 | Pribyl | ............... 305/162 |
| 5,709,440 A | * | 1/1998 | Lecours | ............... 305/178 |
| 5,722,745 A | * | 3/1998 | Courtemanche et al. | .... 305/168 |
| 6,109,705 A | * | 8/2000 | Courtemanche | ............ 305/178 |
| 6,510,913 B1 | * | 1/2003 | Morin et al. | ................. 180/182 |
| 6,575,540 B2 | * | 6/2003 | Soucy et al. | ................. 305/166 |
| 6,609,771 B2 | * | 8/2003 | Morin et al. | ................. 305/178 |
| 6,733,091 B2 | * | 5/2004 | Deland et al. | ............... 305/178 |
| 6,746,090 B2 | * | 6/2004 | St-Pierre | ............... 305/168 |

* cited by examiner

*Primary Examiner*—Russell D. Stormer
*Assistant Examiner*—Jason R. Bellinger
(74) *Attorney, Agent, or Firm*—Robert Brouillette; Ronald S. Kosie; Gaétan Prince

(57) ABSTRACT

This invention relates to an endless traction band that is used to propel snowmobiles and more particularly, to an improved ground-engaging side of the traction band, which helps reduce the noise and vibration levels during the operation of the snowmobile. The various protruding lug configurations defines a predetermined number of different lug profiles, from which the sequence of profiles on the endless band are generated in such a way so that every sequence of profiles is different from one another.

10 Claims, 3 Drawing Sheets

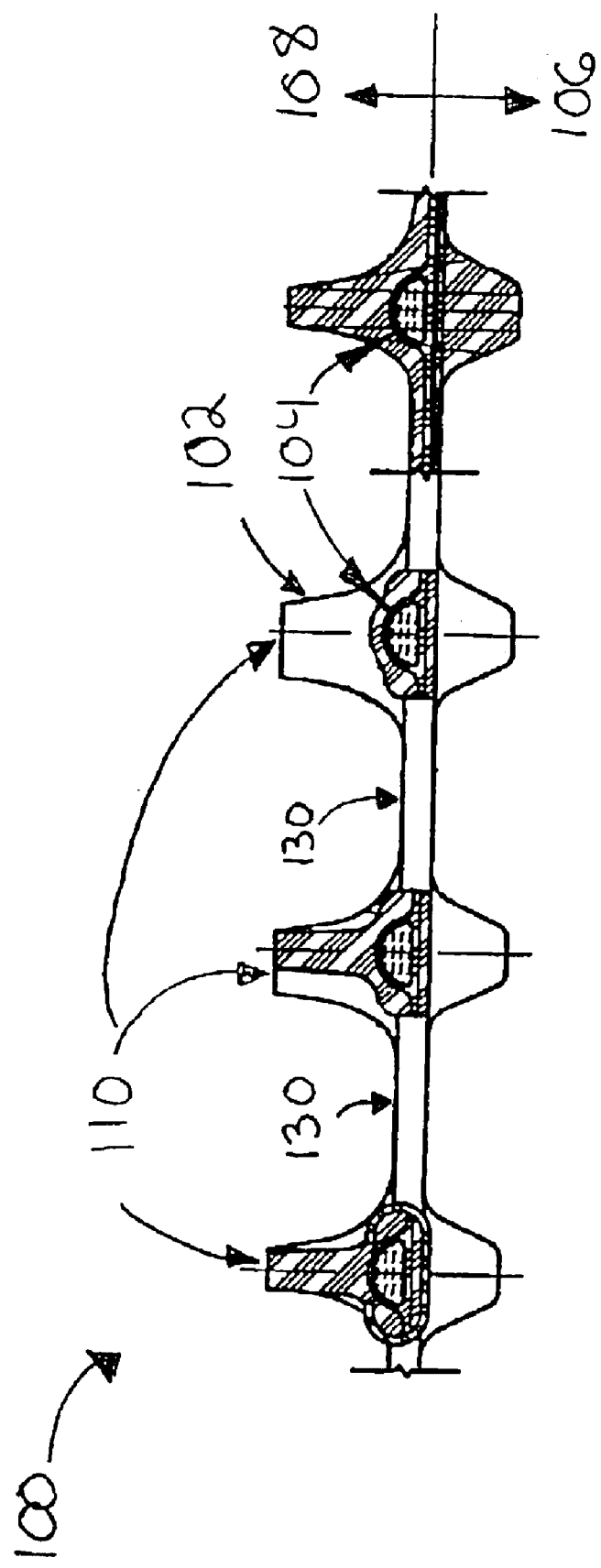

NON-REPEATING SEQUENCE OF PROFILES

FIELD OF INVENTION

This invention relates to an endless traction band that is used to propel snowmobiles and more particularly, to an improved ground-engaging side of the traction band, which helps reduce the noise and vibration levels during the operation of the snowmobile.

BACKGROUND OF THE INVENTION

The present invention relates to an endless traction band for a snowmobile. Such a traction band is designed to travel on snow, on which the use of wheeled vehicle is of little help.

A traction band is usually made of a reinforced molded rubber material, having longitudinally spaced and transversely disposed stiffeners embedded in the rubber material. The endless band is flexible around a lateral axis so that it can follow the curvature around drive and idler sprocket wheels. It is designed to support a significant portion of the total weight of the vehicle and apply a traction force on the ground.

The body of the traction band has a ground-engaging outer side or surface and an inner surface. The inner surface cooperates with a suspension system and delimits the required space for the powering system, like for instance the sprocket wheel and the idler wheel. Along the circumference of the inner surface, two rows of holes generally cooperates with the teeth of the corresponding sprocket wheels and idler wheels or alternatively, those wheels may mesh with driving lugs that are inwardly projecting from the inner side of the band.

The ground-engaging outer side usually has a sequence of profiles that is repeated uniformly over the total length of the traction band. Each sequence of profiles or tread pattern comprises laterally extending profiles that are longitudinally spaced apart by flat areas. Each profile comprises a series of outwardly projecting traction lugs. The choice of lug profiles that are selected to be part of every sequence of profiles, which is repeated along the circumference of the traction band, has an influence on the band behavior on the snow, on the snowmobile performances and on the comfort of the driver. These criteria are very critical in a marketing point of view, since they differentiate products from one another in the eye of a potential customer.

There is always a need for a traction band which enhances the driver-s comfort during a snowmobile ride. As the band reaches certain rotation speeds, the vibration and noise levels can sometimes cause inconveniences to the drivers and the people who are near.

In the prior art, Lecours (U.S. Pat. No. 5,709,440) proposes a snowmobile traction band which he states procures a reduced operation noise, due to the non-uniform arrangement of the traction elements in the tread pattern. Lecours suggests that certain of the external traction lug profiles be spaced non-uniformly in the longitudinal direction of the traction band. However, this suggestion is not practical in respect of snowmobiles using sprocket wheels.

Courtemanche (U.S. Pat. No. 5,722,745) has also addressed that problem by proposing an endless rubber traction band for a snowmobile with what he calls a noise reducing tread pattern. This invention consist of a thread pattern repeated all over the traction band, each comprising the same three successive lug profiles. However, notwithstanding the promised noise reduction, in reality, the noise reduction achieved by Courtemanche is limited if present.

With this invention, the level of noise and vibrations are greatly diminished because no sequence of profiles is repeated along the traction band more than once along its outside circumference. The noise and vibration amplitudes are therefore more optimally broken as the band rotates.

SUMMARY OF THE INVENTION

The object of the invention is to create an endless traction band for a snowmobile with an improved ground-engaging surface which reduces the noise and vibration levels.

On an endless traction band, the tread patterns are located on the ground-engaging surface and consist of a number of consecutive lug profiles, longitudinally spaced from each other by flat areas. The tread pattern is usually repeated many times along the circumference of the traction band.

By selecting a definite number of lug profiles out of a larger number of available and different lug profiles, it is possible to generate many unique sequence of profiles that are each used only once along the entire circumference of the traction band.

More particularly, a sequence of 3 different lug profiles, selected amongst six available and different lug profiles, can generate unique triplets, or sequence of profiles, for a traction band comprising a total of 54 lug profiles on its outer circumference.

Each laterally extending lug profiles are also designed to substantially have the same weight, which helps balance the band.

There is therefore provided a traction band for use with a snowmobile which includes, on the ground-engaging outside surface, traction lugs which protrude outwardly from the outside surface, lug profiles which each extend laterally and are formed by at least one of the traction lugs, flat areas which each extend laterally and include none of the traction lugs, sequences of profiles which are defined by the longitudinal consecutive succession of a predetermined number of the lug profiles which are each separated by the flat areas, each sequence of profiles being different from any other sequences of profiles along the traction band.

Other aspects and many of the attendant advantages will be more readily appreciated as the same becomes better understood by reference to the following detailed description and considered in connection with the accompanying drawings in which like reference symbols designated like elements throughout the figures.

The features of the present invention which are believed to be novel are set forth with particularity in the appended claims.

BRIEF DESCRIPTION OF THE FIGURES

FIG. 4 is a longitudinal section view taken from line 4—4 in FIG. 1.

DETAILED DESCRIPTION OF A PREFERRED EMBODIMENT

A traction band according to a preferred embodiment of the present invention is described hereinafter and illustrated in the appended figures.

Figure 1:
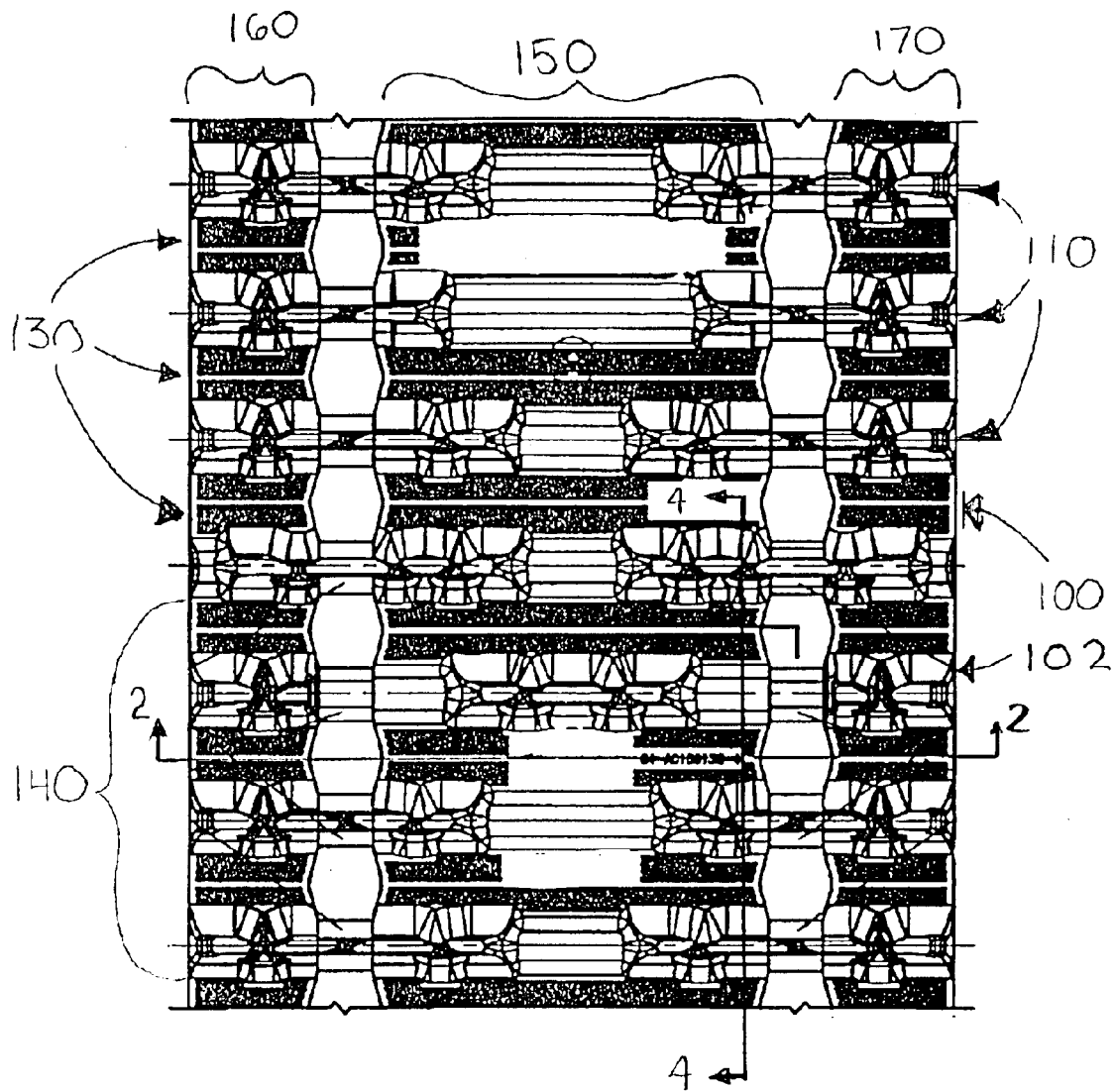
FIG. 1 is a partial top view of an endless traction band in accordance with the invention.
Figure 2:
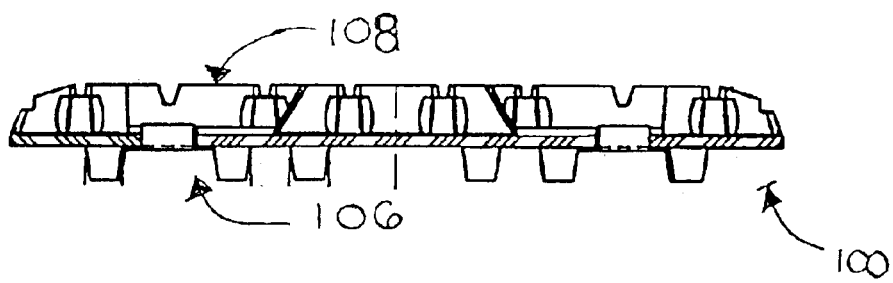
FIG. 2 is a cross-sectional view taken from line 2—2 in FIG. 1.

As shown in the figures, the band 100 is made of an endless body 102 of reinforced rubber material, with longitudinally spaced and transversely disposed stiffeners 104 that may or may not be completely embedded in the rubber material of the endless body 102. FIG. 1 shows the body 102 which comprises a central portion 150 and two lateral band portions (160 and 170) which are located on each side of the central portion 150. The central portion 150 and the lateral band portions (160 and 170) longitudinally extend along the circumference of the endless body 102.

The body 102 of the band 100 has an inner side 106 and a ground-engaging outer side 108 that is usually made from a sequence 140 of profiles (typically doublets or triplets in the prior art) which is repeated over the entire circumference of the traction band 100. Each sequence 140 of profiles comprises a selection of lug profiles 110 which are separated from each other by a flat area 130. The lug profiles 110 in the sequence 140 of profiles affect the band 100 behavior on the ground and the general snowmobile driving comfort which help differentiate one product from the other for the customer.

Figure 3:
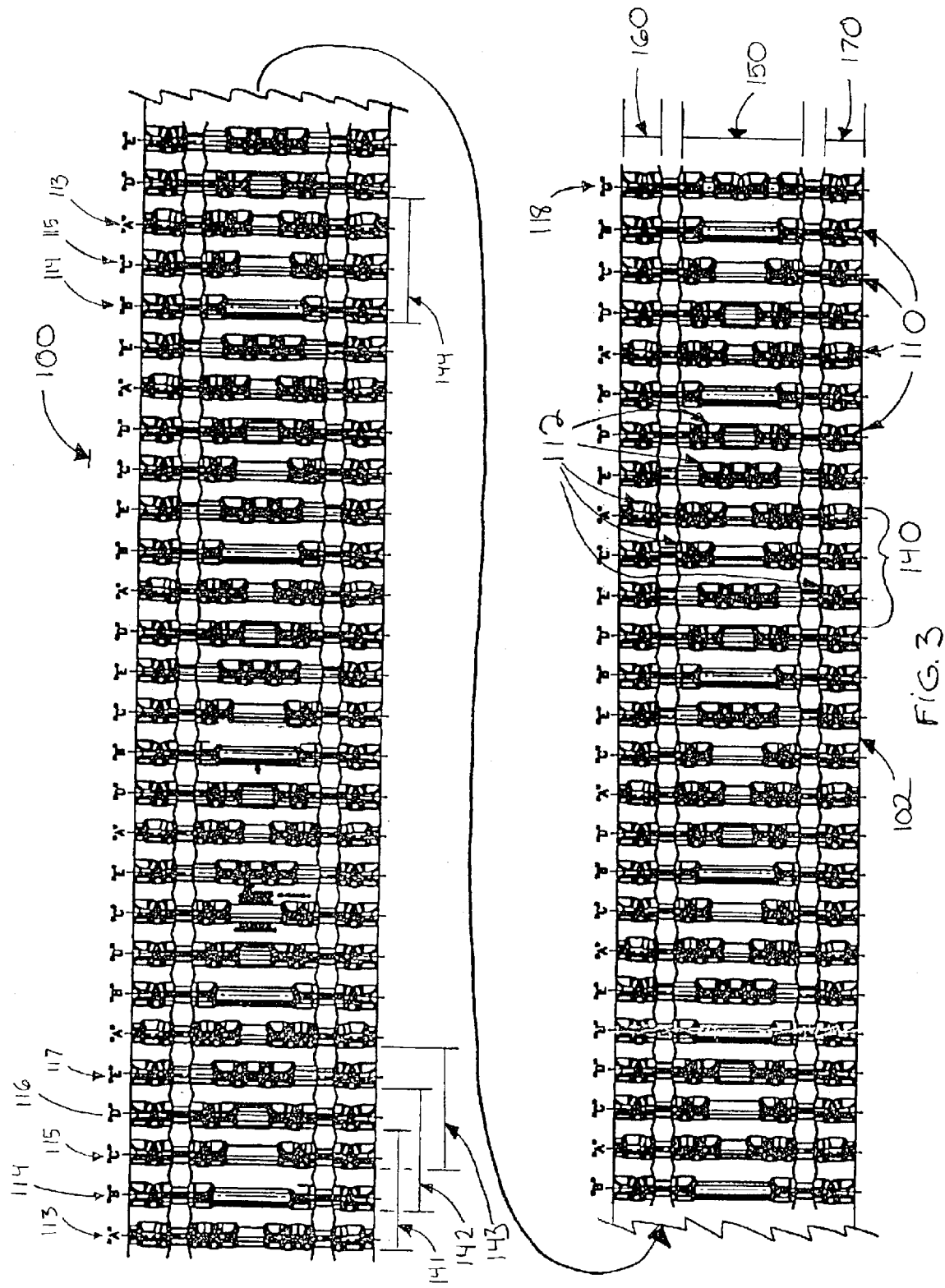
FIG. 3 is a complete top view of an unrolled traction band.

As seen in FIG. 3, each lug profile 110 of the present invention comprises a plurality of different protruding traction lugs 112, which are disposed on the central band portion 150 and on the lateral band portions 160. In this embodiment, five different lug profiles 113, 114, 115, 116, 117 are differentiated by a variation of the lugs 112 distribution along the lateral direction, with respect to the band body 102. Along the longitudinal direction of the traction band 100, any sequence of three consecutive lug profiles 110 comprises different lug profiles 110 and generates a sequence 140 of profiles that is called triplets (141, 142, 143 and 144 only are shown). In this embodiment, each triplets (141, 142, 143 and 144 only are shown) are repeated only once along the circumference of the traction band 100.

For instance, the combination of lug profiles 113, 114 and 115 generates the triplet 141; lug profiles 114, 115 and 116 create triplet 142 and finally, triplet 143 is made of lug profiles 115, 116 and 117.

The five different lug profiles 113, 114, 115, 116, 117 are alternatively disposed on the outside face 108 of the traction band 100, so that each triplet (141, 142, 143 and 144 only are shown) is different from any other along the band 100.

Statistically speaking, to achieve the configuration of having every consecutive sequence of profiles (for instance 141, 142, 143) different along the circumference of the traction band 100, this invention only requires "n" different lug profiles 110 so that the following equation is respected:

$$n!/(n-k)! >= m$$

EQUATION #1 where m is the total number of lug profiles 110 on the traction band 100 and k is the number of lug profiles 110 in a sequence 140 of profiles.

Given a fixed total number of 'm' lug profiles 110 on the traction band 100, this equation helps the traction band designer to evaluate the minimum required number 'n' of different lug profiles 110 to allow the generation of sequences 140 containing a number 'k' (k=2 for doublets, k=3 for triplets, k=4 for quadruplets, etc . . . ) of adjacent lug profiles 110. Each sequence 140 of profiles is repeated only once along the traction band 100, by allowing the permutation of the lug profiles 110 in the different sequences 140 of profiles. The number 'm' also defines the total number of sequences 140 of profiles on the traction band 100, since each lug profile 110 acts once as the first lug profile 110 in the sequences 140 of profiles, regardless of the number 'k' of lug profiles 110 in each sequence 140 of profiles.

In the embodiment shown, triplets are used (k=3), meaning that the sequences 140 of profiles consists of three consecutive and different lug profiles. To comply with this invention, every sequence of 3 consecutive lug profiles 110 along the traction band 100 must be different from one another. In this embodiment, since the traction band 100 contains a total of 54 lug profiles 110 (m=54), only 5 different lug profiles 110 (n=5) are required to comply with this requirement. The left term of equation #1 gives the number "60" (k=3 and n=5), which is higher or equal to the right term of the equation (m=54).

For instance, triplet 141 which is a sequence 140 of profiles made from the consecutive lug profiles 113, 114 and 115 is different than triplet 144, which is another sequence of profiles along the circumference of the traction band 100 made from consecutive lug profiles 114, 115 and 113. No repetition of the same lug profile (113, 114, 115, 116 or 117) is considered in any sequence 140 of profiles of the current embodiment. However, such repetitions could be used without departing from the spirit of the invention.

Each sequence 140 of profiles is unique along the outside circumference of the traction band 100. For instance, triplet 141 is made of lug profiles 113, 114 and 115. Along one of the circumferential direction of the traction band 100, the next triplet 142 is made of lug profiles 114, 115 and 116. Both triplets 141 and 142 comprises a different succession of lug profiles 110 and more generally, any two other consecutive sequences 140 of profiles along the traction band 100 are different from one another.

On the same note, triplet 143, which is made of lug profiles 115, 116 and 117 is also different from triplet 141. Triplet 143 is positioned second next to triplet 141, along the same circumferential direction of the traction band 100. More generally, any two sequences 140 of profiles are different from one another, whatever the respective position they have with regards to the other sequence 140 of profiles along the traction band 100. In the embodiments presented herein, each sequence 140 of profiles, which comprises a number 'k' of profiles selected from a number 'n' of different lug profiles 110, is unique along the traction band 100.

A second embodiment of this invention consists in using unique sequences 140 of profiles along the traction band 100, but this time with no permutation of the lug profiles 110 allowed in all the possible "k" number of consecutive lug profiles 110.

In the previous embodiment, triplet 141 which is a sequence 140 of profiles made from the consecutive lug profiles 113, 114 and 115 (k=3) is considered to be different from triplet 144, which is made from consecutive lug profiles 114, 115 and 113, even if both triplets (141 and 144) are made from the same lug profiles. (113, 114, 115) that have been permuted in the sequences 140 of profiles.

The second embodiment follows a different relation where the permutation of the lug profiles 110 in two sequences 140 of profiles is not enough to differentiate the sequences 140 of profiles from one another. This embodiment's relation is given by the equation:

$$n!/[k!*(n-k)!]>=m$$

EQUATION #2 where the number 'n' represents the required number of different lug profiles 110 used on a traction band 100 comprising a total number 'm' of lug profiles 110 on its outside surface, if every different sequences 140 of profiles comprises a number 'k' of successive lug profiles 110. In a triplet configuration (k=3) and for a traction band of 54 profiles (m=54), the required number 'n' of different lug profiles 110 is at least 8 (n=8), which is higher than the 5 required 'n' profiles 110 (n=5) of the preferred embodiment where permutation of profiles 110 is allowed in each sequence 140 of profiles.

In still a preferred embodiment, the lug profiles 110 all substantially have the same weight, to help the balancing requirements of the traction band 100 once it is mounted on the snowmobile. With this configuration, the local balancing of each lug profile 110 combined with the overall unbalance created by the use of non-repeating sequences 140 of profiles add flexibility to the design of the endless traction band 100 and offers at the same time a stable ride to the driver with diminished level of noise and vibrations.

In FIG. 3, another lug profile 118 is inserted once on the traction band 100. By using more than the minimum of required different lug profiles 110 than the value "n" obtained from equation #1, each unique triplets (141, 142, 143 and 144 only are shown), will contain three of the available lug profiles (from 113, 114, 115, 116, 117 or 118) and will offer the designer more flexibility to select each unique sequence 140 of profiles which will still result with a well balanced traction band, with reduced noise and vibration levels. Since the left side of equation #1 needs to be larger or equal to the right side of the equation, the addition of more than the required "n" profiles for a defined "k" number of lug profiles 110 in a sequence 140 of profiles will still comply with equation #1. In the embodiment shown in FIG. 3, n=6 (113, 114, 115, 116, 117 or 118); k=3(triplets) and m=54 (total number of lug profiles 110 on the traction band 100). When placed in equation #1, the "n", "m" and "k" values gives the relation 120>=54, which is still true.

With this invention, the level of noise and vibrations are greatly diminished. By providing the traction band 100 with unique grouping, for example triplets (141, 142, 143 and 144 only are shown), the noise and vibration amplitudes are broken every time a different lug profile 110 engages on the ground. In this embodiment, the use of six different lug profiles 113, 114, 115, 116, 117, 118 offers an optimal lug profile 110 dispersion along the traction band 100.

For snowmobiles which are equipped with an endless rubber traction band 100, the capacity to offer to the users a smooth and stable ride with the minimum of noise and vibrations levels represents one of the characteristics that is most appreciated by customers.

Although a preferred embodiment of the invention has been described in detail herein and illustrated in the accompanying figures, it is to be understood that the invention is not limited to this precise embodiment and that various changes and modifications may be effected therein without departing from the scope or spirit of the present invention.

What is claimed is:

1. A traction band for use with a snowmobile, comprising on the ground-engaging outside surface:

traction lugs which protrude outwardly from the said outside surface;

lug profiles, each of which extend laterally and are formed at least one of the said traction lugs;

flat areas, each of which extend laterally and comprise none of the said traction lugs;

sequences of profiles which are defined as the longitudinal consecutive succession of a predetermined number of said lug profiles which are each separated by one of the said flat areas;

wherein each said sequence of profiles is different from any other sequences of profiles along the said traction band.

2. A traction band, as claimed in claim 1, wherein the said traction band comprises an arrangement of the said lug profile which follows the relation:

$$n!/(n-k)!>=m$$

wherein "n" represents the number of different said lug profiles, each having a different arrangement of the said traction lugs;

and wherein "k" represents the said predetermined number of different said lug profiles in the said sequences of profiles;

and wherein "m" represents the total number of the said lug profiles on the said endless band.

3. A traction band, as claimed in claim 2, wherein k=3 and wherein n=5 at least, for the said traction band with m=54.

4. A traction band, as claimed in claim 2, wherein k=1 and wherein n=54 at least, for the said traction band with m=54.

5. A traction band, as claimed in claim 2, wherein k=2 and wherein n=8 at least, for the said traction band with m=54.

6. A traction band, as claimed in claim 2, wherein k=4 and wherein n=5 at least, for the said traction band with m=54.

7. A traction band, as claimed in claim 2, wherein k=5 and wherein n=5 at least, for the said traction band with m=54.

8. A traction band, as claimed in claim 2, wherein k=6 and wherein n=5 at least, for the said traction band with m=54.

9. A traction band, as claimed in claim 2, wherein each said lug profile has the same weight.

10. A traction band, as claimed in claim 2, wherein each said sequence of profiles comprising the said predetermined number k of the said lug profiles is different from any other said sequence of profiles along the said traction band.

* * * * *